(12) United States Patent
Suciu et al.

(10) Patent No.: US 9,828,914 B2
(45) Date of Patent: Nov. 28, 2017

(54) THERMAL MANAGEMENT SYSTEM AND METHOD OF CIRCULATING AIR IN A GAS TURBINE ENGINE

(71) Applicant: UNITED TECHNOLOGIES CORPORATION, Farmington, CT (US)

(72) Inventors: Gabriel L. Suciu, Glastonbury, CT (US); Jesse M. Chandler, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 264 days.

(21) Appl. No.: 14/685,392

(22) Filed: Apr. 13, 2015

(65) Prior Publication Data
US 2016/0298544 A1    Oct. 13, 2016

(51) Int. Cl.
| | |
|---|---|
| *B64C 11/14* | (2006.01) |
| *F02C 7/047* | (2006.01) |
| *F02C 7/06* | (2006.01) |
| *F01D 25/02* | (2006.01) |
| *F01D 25/12* | (2006.01) |

(52) U.S. Cl.
CPC .............. *F02C 7/047* (2013.01); *F01D 25/02* (2013.01); *F01D 25/12* (2013.01); *F02C 7/06* (2013.01); *F01D 25/125* (2013.01); *F05D 2260/213* (2013.01); *Y02T 50/676* (2013.01)

(58) Field of Classification Search
CPC .......... F01D 5/187; F01D 25/12; F01D 25/02; F01D 25/10; F02C 7/047; F05D 2260/213; F04D 19/002; F04D 29/388; F04D 29/584; F04D 29/329; B64C 11/14
See application file for complete search history.

(56) References Cited

U.S. PATENT DOCUMENTS

| | | | | |
|---|---|---|---|---|
| 2,726,725 | A * | 12/1955 | Nichols | B64C 11/14 416/94 |
| 2,891,627 | A | 6/1959 | Ditmer et al. | |
| 4,722,666 | A | 2/1988 | Dennison et al. | |
| 4,999,994 | A * | 3/1991 | Rud | F02C 7/047 416/170 R |
| 7,559,191 | B2 * | 7/2009 | Parks | B64C 11/14 416/94 |
| 8,221,080 | B2 * | 7/2012 | Clemen | B64C 11/14 416/94 |
| 2013/0259687 | A1 | 10/2013 | Suciu et al. | |

FOREIGN PATENT DOCUMENTS

GB        1357112 A        6/1974

OTHER PUBLICATIONS

European Search Report for Application No. EP 16 16 5168.

* cited by examiner

*Primary Examiner* — Ninh H Nguyen
(74) *Attorney, Agent, or Firm* — Cantor Colburn LLP

(57) ABSTRACT

A thermal management system and method of circulating air in a gas turbine engine are disclosed. The thermal management system includes a nose cone having an aperture communicating air to an interior space of the nose cone and a fan blade coupled to the nose cone and having a blade passage, wherein the nose cone rotates with the fan blade to circulate air from the aperture to the blade passage.

20 Claims, 6 Drawing Sheets

9,828,914 B2

THERMAL MANAGEMENT SYSTEM AND METHOD OF CIRCULATING AIR IN A GAS TURBINE ENGINE

TECHNICAL FIELD OF THE DISCLOSED EMBODIMENTS

The present disclosure is generally related to turbine engines, in particular to a thermal management system and a method of circulating air in a gas turbine engine.

BACKGROUND OF THE DISCLOSED EMBODIMENTS

Gas turbine engines include bearing assemblies to support the rotating shafts of the engine. During operation, the bearing assemblies experience high thermal loads that may be controlled with a thermal management system. A thermal management system utilizes a heat exchanger to cool fluids such as oil flowing to and from bearing assemblies or other engine components. A thermal management system enhances durability and provides efficient operation of bearing assemblies and other engine components. However, thermal management systems often include a complex network of airflow circulation pathways and fluid lines to effectively cool the high temperature fluid. In some gas turbine engines, incorporation of a thermal management system is challenging.

Therefore, a need exists in the art for a thermal management system for a gas turbine engine having enhanced efficiency and applicability.

SUMMARY OF THE DISCLOSED EMBODIMENTS

In an embodiment, a thermal management system for a gas turbine engine is disclosed comprising a nose cone having an aperture communicating air to an interior space of the nose cone, and a fan blade coupled to the nose cone and having a blade passage, wherein the nose cone rotates with the fan blade to circulate air from the aperture to the blade passage.

In a further embodiment of the above, the blade passage extends to a blade trailing edge to circulate air from the aperture to the blade trailing edge. In a further embodiment of any of the above, the blade passage radially extends from a blade neck to the blade trailing edge to circulate air from the aperture to the blade trailing edge. In a further embodiment of any of the above, the nose cone further includes an upstream air pump disposed at the aperture to communicate air to the interior space with rotation of the nose cone. In a further embodiment of any of the above, the upstream air pump includes a guide vane disposed in the aperture to communicate air to the interior space. In a further embodiment of any of the above, the nose cone includes a plurality of apertures and the upstream air pump includes a plurality of guide vanes disposed in the plurality of apertures to communicate air to the interior space. In a further embodiment of any of the above, the nose cone further includes a downstream air pump disposed downstream of the heat exchanger to communicate air to the blade passage with rotation of the nose cone. In a further embodiment of any of the above, the system further comprises a plurality of fan blades, wherein the downstream air pump includes a plurality of blades axially aligned with the plurality of fan blades. In a further embodiment of any of the above, the system further comprises a heat exchanger disposed in the interior space, wherein the heat exchanger is in fluid communication with a lubricant circulation system disposed in a forward portion of the gas turbine engine. In a further embodiment of any of the above, the lubricant circulation system includes a lubricant filter disposed in the nose cone.

In another embodiment, a method of circulating air in a gas turbine engine is disclosed comprising providing a nose cone having an aperture and an interior space, providing a fan blade having a blade passage, rotating the nose cone with the fan blade, communicating air to the interior space of the nose cone through the aperture, and communicating air from the interior space to the blade passage.

In a further embodiment of any of the above, the method further comprises providing a blade trailing edge at a downstream end of the blade passage, and circulating air from the aperture to the blade trailing edge. In a further embodiment of any of the above, the method further comprises providing a blade neck at an upstream end of the blade passage, and circulating air radially outward from the blade neck through the blade passage. In a further embodiment of any of the above, the method further comprises providing an upstream air pump at the aperture, and pumping air to the interior space with rotation of the nose cone. In a further embodiment of any of the above, the upstream air pump includes a guide vane disposed in the aperture to pump air to the interior space. In a further embodiment of any of the above, the nose cone includes a plurality of apertures and the upstream air pump includes a plurality of guide vanes disposed in the plurality of apertures to communicate air to the interior space. In a further embodiment of any of the above, the method further comprises providing a heat exchanger in the interior space, wherein the nose cone further includes a downstream air pump disposed downstream of the heat exchanger to communicate air to the blade passage with rotation of the nose cone. In a further embodiment of any of the above, the method further comprises providing a plurality of fan blades, providing a plurality of blades in the downstream air pump axially aligned with the plurality of fan blades, and communicating air to the blade passage with the rotation of the nose cone. In a further embodiment of any of the above, the method further comprises providing a heat exchanger in the interior space, providing a lubricant circulation system in fluid communication with the heat exchanger and disposed in a forward portion of the gas turbine engine, and circulating lubricant through the heat exchanger and the lubricant circulation system. In a further embodiment of any of the above, the method further comprises providing a lubricant filter in the lubricant circulation system, and circulating lubricant through the lubricant filter.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the disclosure, reference will now be made to certain embodiments and specific language will be used to describe the same. It will nevertheless be understood that no limitation of the scope of the disclosure is thereby intended, and alterations and modifications in the illustrated device, and further applications of the principles of the disclosure as illustrated therein are herein contemplated as would normally occur to one skilled in the art to which the disclosure relates.

Figure 1:
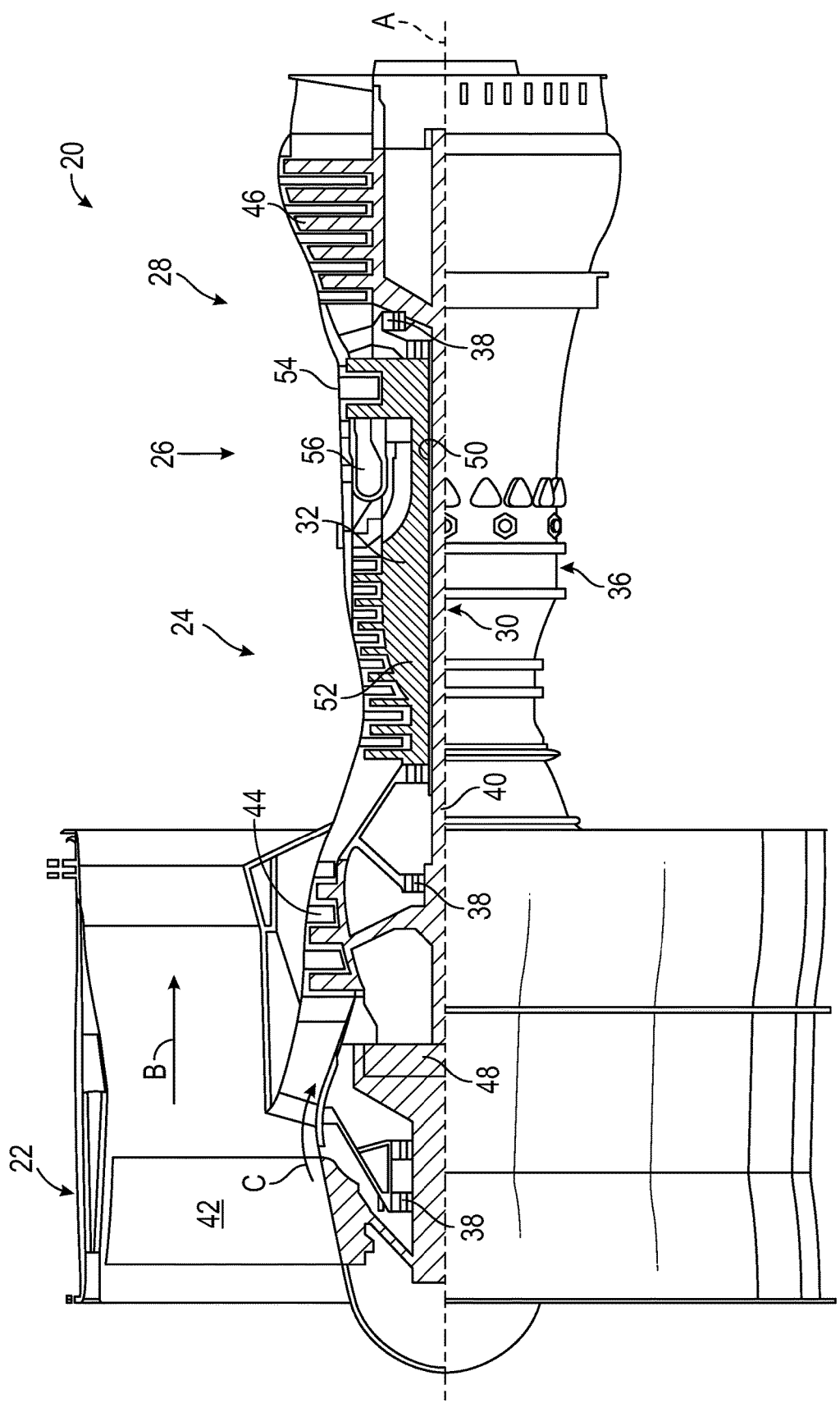
FIG. 1 is a sectional view of one example of a gas turbine engine in which the presently disclosed embodiments may be used.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° \text{ R})/(518.7° \text{ R})]^{0.5}$. The "Low corrected fan tip speed" as disclosed herein according to one non-limiting embodiment is less than about 1150 ft/second (350.5 m/sec).

Figure 2:
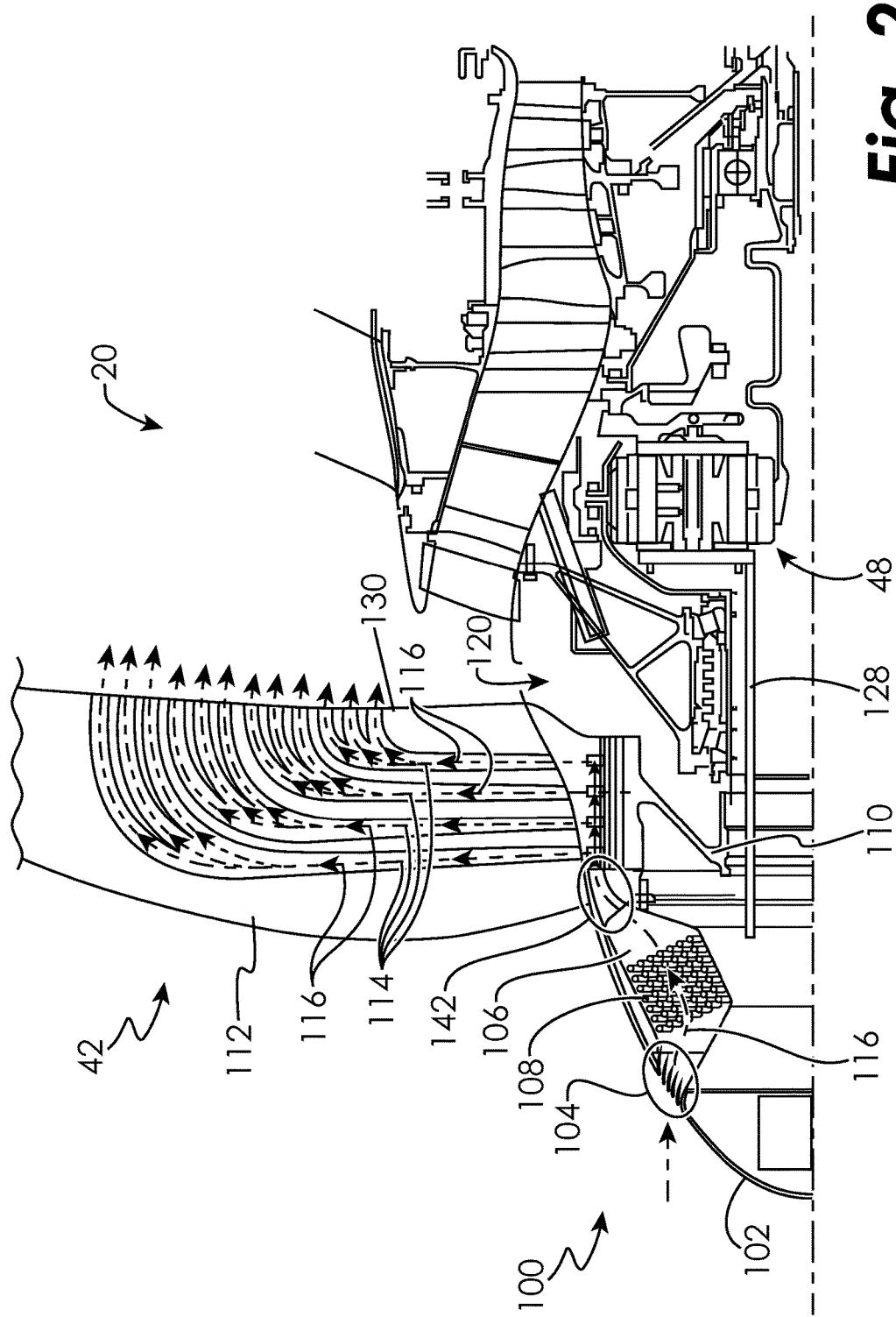
FIG. 2 is a partial cross sectional view of a gas turbine engine in one embodiment.

Referring now to FIG. 2, a thermal management system 100 for a gas turbine engine in accordance with one embodiment is shown. The system 100 includes a nose cone 102 having at least one aperture 104 communicating air to an interior space 106 of the nose cone 102. At least one heat exchanger 108 is disposed in the interior space 106.

The fan 42 includes a fan hub 110 securing a plurality of fan blades 112. Each of the fan blades 112 and the fan hub 110 are coupled to the nose cone 102 such that rotation of the fan 42, the fan hub 110, and each of the fan blades 112 results in rotation of the nose cone 102. A single fan blade 112 is illustrated in FIG. 2 and includes a blade passage 114 formed as an internal cavity within the fan blade 112. The plurality of fan blades 112 surrounding the fan hub 110 may each feature a blade passage 114 as illustrated. The nose cone 102 rotates with the fan blade 112 to circulate air from the aperture 104 to the blade passage 114 as illustrated by airflow lines 116. The blade passage 114 of the fan blade 112 extends in a radially outward direction to a blade trailing edge 130. The low pressure at the blade trailing edge 130 pumps, draws, or otherwise circulates air from the aperture 104 and interior space 106 to the blade trailing edge 130.

The aperture 104 may include a plurality of apertures 104 to communicate air into the interior space 106 of the nose cone 102. The apertures 104 shown in the embodiment of FIG. 2 are curved for flow control of air into the interior space 106. The heat exchanger 108 may be generally frustoconical and disposed in the interior space 106, adjacent the apertures 104, to utilize airflow through the apertures 104 for cooling of fluids. The heat exchanger 108 may include an annular, circumferentially-extending heat exchanger 108 positioned adjacent one or more annular apertures 104, as illustrated in further detail in FIG. 5, or a plurality of circumferentially spaced heat exchangers 108 disposed adjacent circumferentially spaced apertures 104. Any number, geometry, or arrangement of heat exchangers 108 or apertures 104 may be utilized in the present disclosure.

Figure 3:
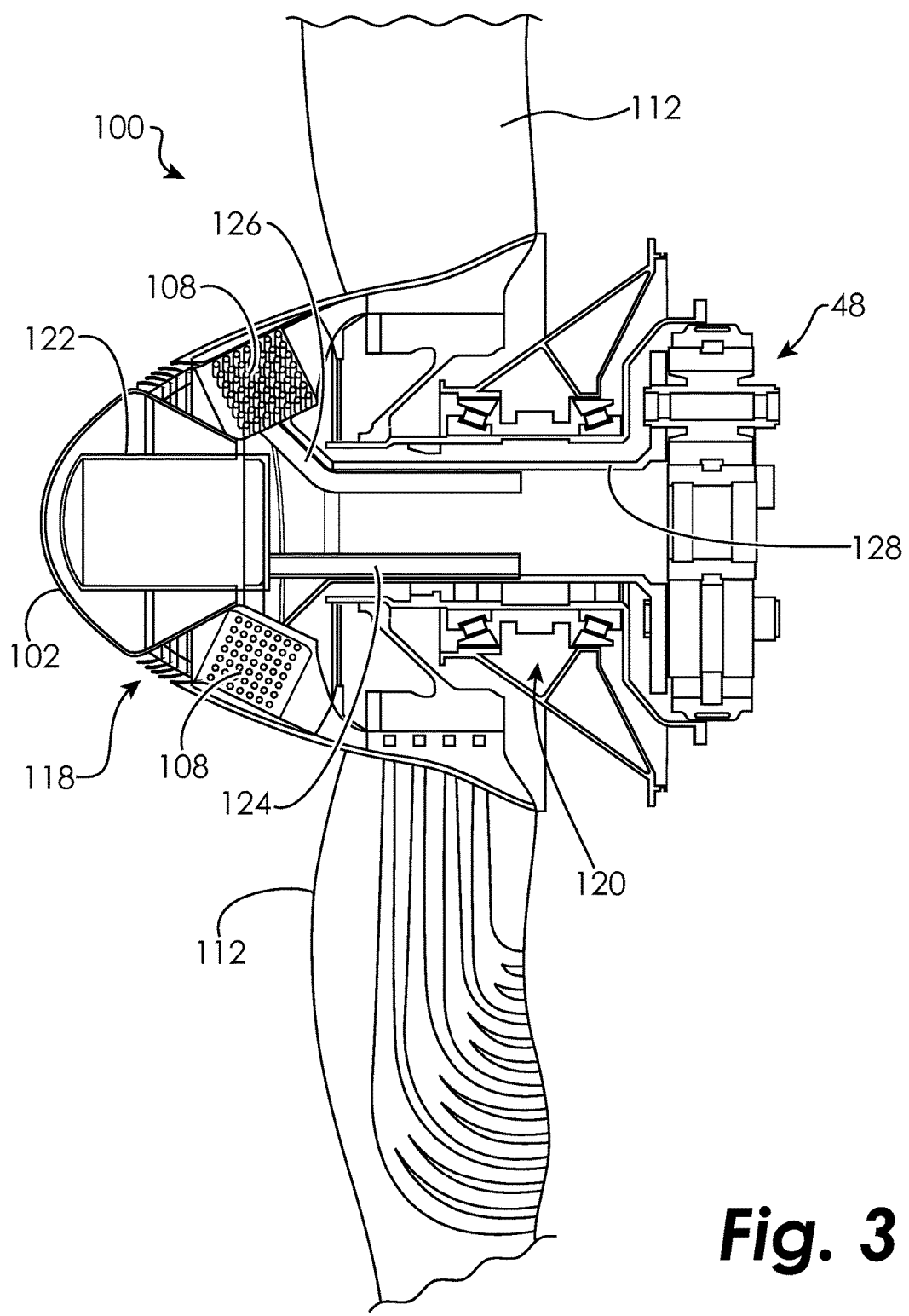
FIG. 3 is a partial cross sectional view of a gas turbine engine in one embodiment.

Referring now to FIG. 3, the heat exchanger 108 of one or more embodiments is in fluid communication with a lubricant circulation system 118 disposed in a forward portion 120 of the gas turbine engine 20. The lubricant circulation system 118 includes a lubricant filter 122 disposed in the nose cone 102. The lubricant circulation system 118 of additional embodiments also includes one or more lubricant inlet conduits 124, one or more lubricant outlet conduits 126, and a lubricant pump (not shown). The lubricant circulation system 118 is stationary and coupled to a carrier 128 of the geared architecture 48 in the forward portion 120.

Figure 4:
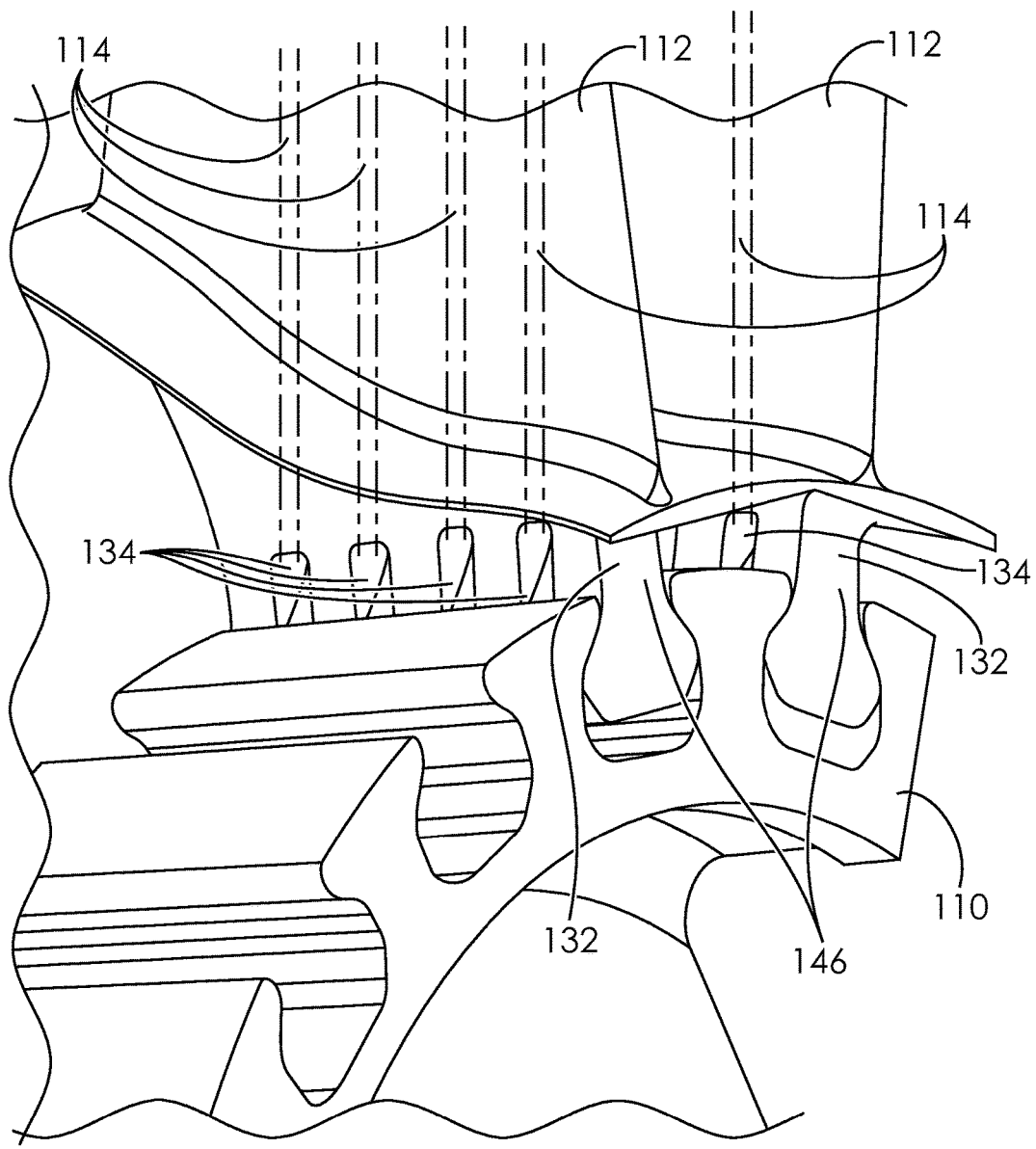
FIG. 4 is a perspective view of a gas turbine engine in one embodiment.

Referring now to FIG. 4 with continuing reference to FIG. 2, the blade passage 114 extends in a radial direction from a blade neck 132 to the blade trailing edge 130 to circulate air from the aperture 104 to the blade trailing edge 130. The blade neck 132 includes a plurality of blade passage inlets 134. A plurality of blade passages 114 extend from the blade passage inlets 134 to supply air to the blade passage outlets 136 at the blade trailing edge 130. The blade passages 114, inlets 134, and outlets 136 are sized and positioned to control air circulation and satisfy pressure and airflow requirements for the system 100 based on, as non-limiting examples, heat exchanger performance and trailing edge blowing capability.

Figure 5:
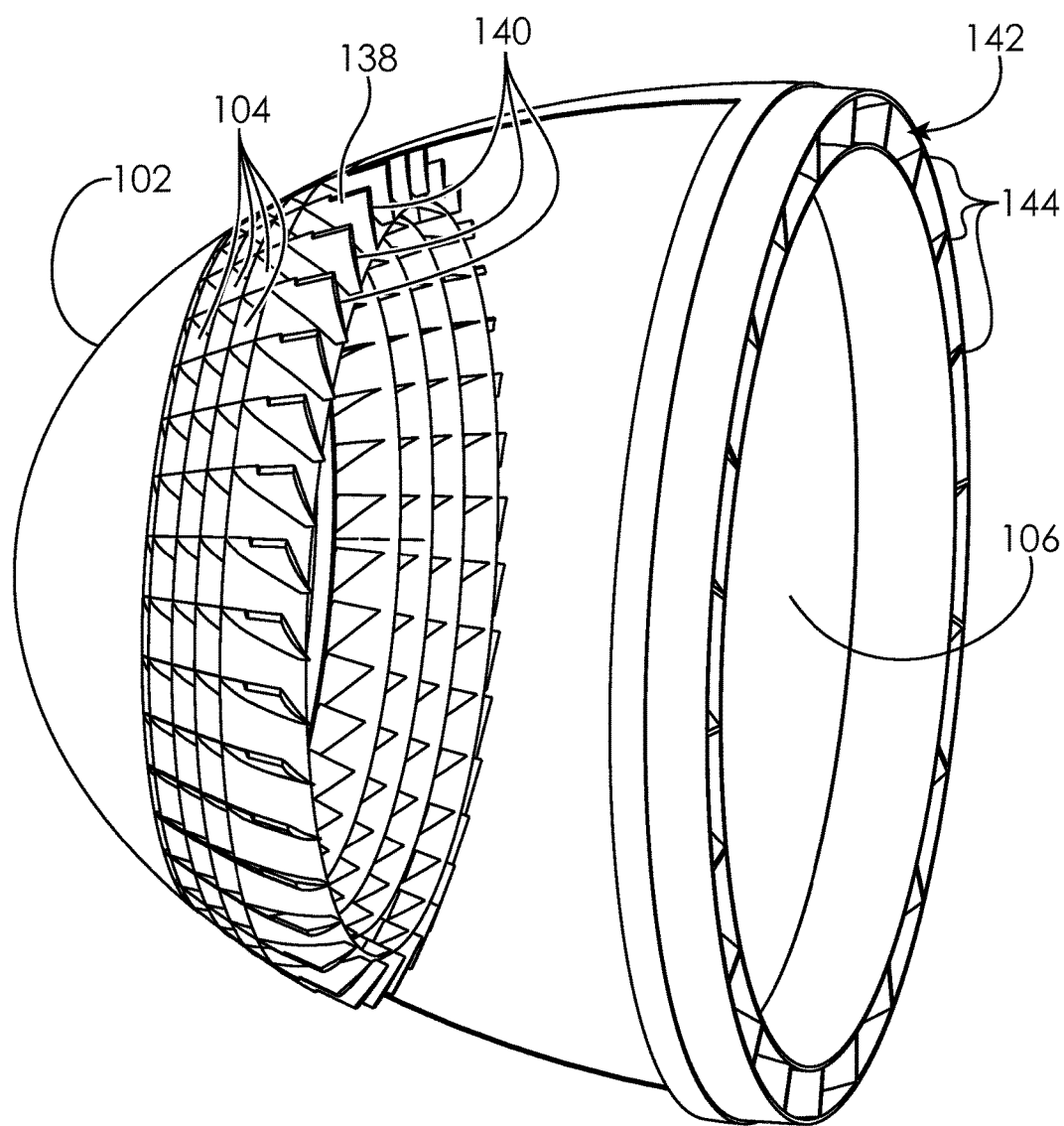
FIG. 5 is a perspective view of a gas turbine engine in one embodiment.

Referring now to FIG. 5 with continuing reference to FIG. 2, the nose cone 102 of an embodiment further includes an upstream air pump 138 disposed at the aperture 104 to communicate air to the interior space 106 with rotation of the nose cone 102. The upstream air pump 138 includes one or more guide vanes 140 disposed in or adjacent to the aperture 104 to draw air into the interior space 106. In the embodiment shown in FIG. 5, the nose cone 102 includes a plurality of apertures 104 and a plurality of circumferentially spaced guide vanes 140 to communicate air to the interior space 106.

The nose cone 102 of an embodiment further includes a downstream air pump 142 disposed downstream of the heat exchanger 108 when the nose cone 102 is mounted on the engine 20 to communicate air to the blade passages 114 with rotation of the nose cone 102. The downstream air pump 142 of one embodiment includes a plurality of circumferentially spaced blades 144 whereby each of the blades 144 is axially aligned with each of the plurality of fan blades 112. The position of the blades 144 of the downstream air pump 142 aids the circulation of air to the fan blades 112 by reducing direct impingement on the generally flat front surfaces 146 of the fan blade necks 132, as shown in FIG. 4.

Figure 6:
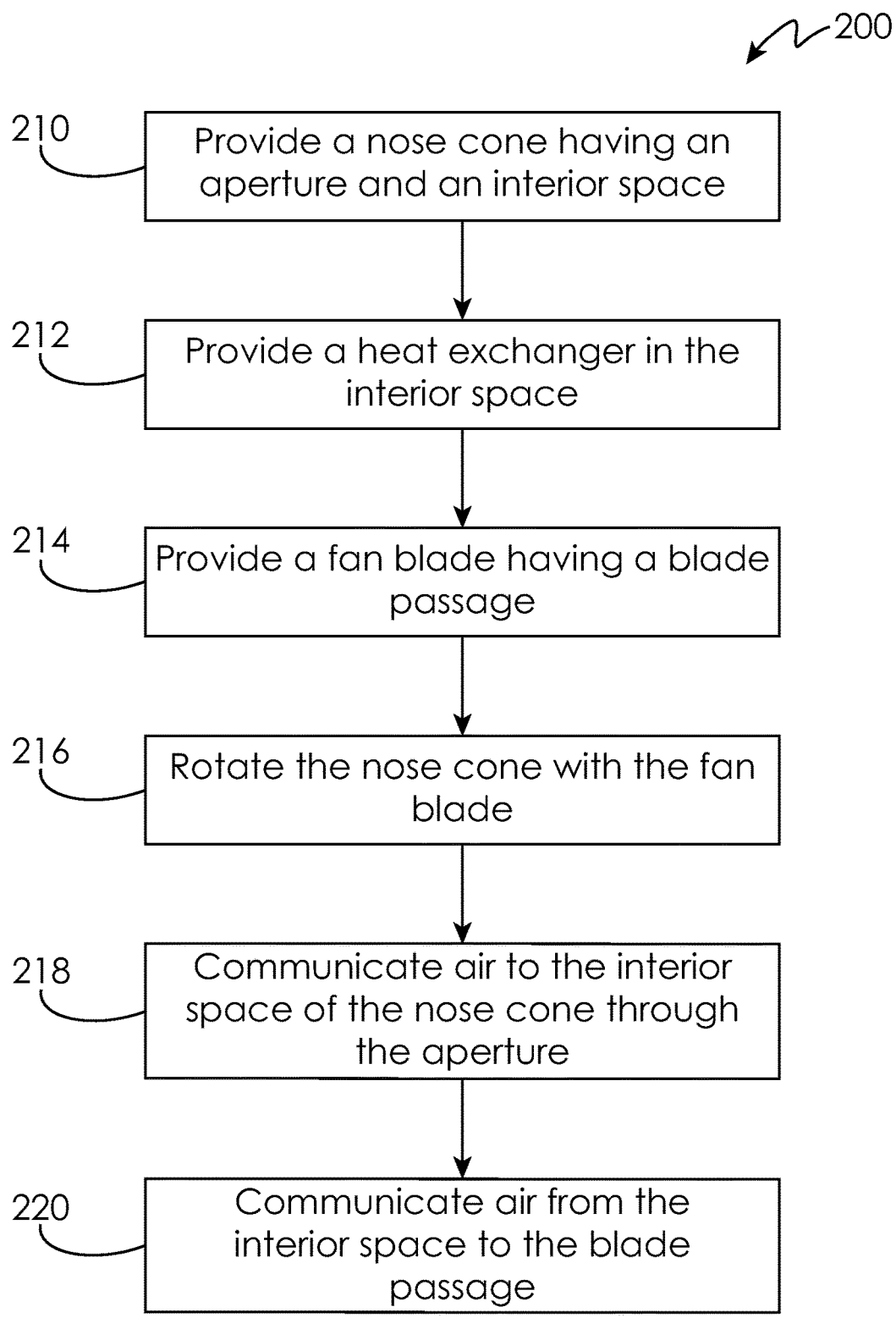
FIG. 6 illustrates a method of circulating air in a gas turbine engine in one embodiment.

Referring now to FIG. 6, a method 200 of circulating air in a gas turbine engine is provided. The method 200 includes providing, at step 210, the nose cone 102 having the aperture 104 and the interior space 106, providing, at step 212, the heat exchanger 108 in the interior space 106, and providing, at step 214, the fan blade 112 having the blade passage 114. The method 200 further includes rotating, at step 216, the nose cone 102 with the fan blade 112, communicating, at step 218, air to the interior space 106 of the nose cone 102 through the aperture 104, and communicating, at step 220, air from the interior space 106 to the blade passage 114.

Additional embodiments of the method 200 include providing the blade trailing edge 130 at a downstream or radially outer end of the blade passage 114 and circulating air from the aperture 104 to the blade trailing edge 130, providing the blade neck 132 at an upstream or radially inner end of the blade passage 114 and circulating air radially outward from the blade neck 132 through the blade passage 114, providing the upstream air pump 138 at the aperture 104, and pumping air to the interior space 106 with rotation of the nose cone 102. The method 200 may further comprise providing the plurality of fan blades 112 and the plurality of blades 144 in the downstream air pump 142 axially aligned with the plurality of fan blades 112, and communicating air to the blade passage 114 with the rotation of the nose cone 102. The method 200 may further include providing the lubricant circulation system 118 and the lubricant filter 122 in fluid communication with the heat exchanger 108 and disposed in the forward portion 120 of the gas turbine engine 20 and circulating lubricant through the heat exchanger 108, the lubricant filter 122, and the lubricant circulation system 118.

The heat exchanger 108 increased the temperature of the free-stream air entering the one or more apertures 104 as a result of capturing thermal energy from fluid flowing through the heat exchanger 108. The higher temperature airflow transmits thermal energy to outer surfaces of the nose cone 102 and the fan blades 112 to limit ice formation on those components without the need for additional fan bleed consumption. The blade passage 114 releases the airflow at a radially outer location such that the higher temperature airflow is supplied to the engine 20 through the bypass flow path B rather than the core flow path C, as illustrated in FIG. 2, thereby maximizing the volume of cooler, denser air entering the core flow path C. Additionally, the nose cone 102 and lubrication circulation system 118 are relatively compact and self-contained to allow direct part substitution with nose cone assemblies of gas turbine engines that may benefit from a thermal management system.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:
1. A thermal management system for a gas turbine engine comprising:
 a nose cone having an aperture communicating air to an interior space of the nose cone;
 a fan blade coupled to the nose cone and having a blade passage formed as an internal cavity within the fan blade, wherein the nose cone rotates with the fan blade to circulate air from the aperture to the blade passage.

2. The system of claim 1, wherein the blade passage extends to a blade trailing edge to circulate air from the aperture to the blade trailing edge.

3. The system of claim 2, wherein the blade passage radially extends from a blade neck to the blade trailing edge to circulate air from the aperture to the blade trailing edge.

4. The system of claim 1, wherein the nose cone further includes an upstream air pump disposed at the aperture to communicate air to the interior space with rotation of the nose cone.

5. The system of claim 4, wherein the upstream air pump includes a guide vane disposed in the aperture to communicate air to the interior space.

6. The system of claim 4, wherein the nose cone includes a plurality of apertures and the upstream air pump includes a plurality of guide vanes disposed in the plurality of apertures to communicate air to the interior space.

7. The system of claim 1, wherein the nose cone further includes a downstream air pump disposed downstream of a heat exchanger to communicate air to the blade passage with rotation of the nose cone.

8. The system of claim 7, further comprising a plurality of fan blades, wherein the downstream air pump includes a plurality of blades axially aligned with the plurality of fan blades.

9. The system of claim 1, further comprising a heat exchanger disposed in the interior space, wherein the heat exchanger is in fluid communication with a lubricant circulation system disposed in a forward portion of the gas turbine engine.

10. The system of claim 9, wherein the lubricant circulation system includes a lubricant filter disposed in the nose cone.

11. A method of circulating air in a gas turbine engine comprising: providing a nose cone having an aperture and an interior space; providing a fan blade having a blade passage;
rotating the nose cone with the fan blade;
communicating air to the interior space of the nose cone through the aperture; and communicating air from the interior space to the blade passage, wherein in the blade passage is formed as an internal cavity within the fan blade.

12. The method of claim 11, further comprising:
providing a blade trailing edge at a downstream end of the blade passage; and circulating air from the aperture to the blade trailing edge.

13. The method of claim 11, further comprising:
providing a blade neck at an upstream end of the blade passage; and
circulating air radially outward from the blade neck through the blade passage.

14. The method of claim 11, further comprising: providing an upstream air pump at the aperture; and pumping air to the interior space with rotation of the nose cone.

15. The method of claim 14, wherein the upstream air pump includes a guide vane disposed in the aperture to pump air to the interior space.

16. The method of claim 15, wherein the nose cone includes a plurality of apertures and the upstream air pump includes a plurality of guide vanes disposed in the plurality of apertures to communicate air to the interior space.

17. The method of claim 11, further comprising:
providing a heat exchanger in the interior space, wherein the nose cone further includes a downstream air pump disposed downstream of the heat exchanger to communicate air to the blade passage with rotation of the nose cone.

18. The method of claim 17, further comprising: providing a plurality of fan blades;
providing a plurality of blades in the downstream air pump axially aligned with the plurality of fan blades; and
communicating air to the blade passage with the rotation of the nose cone.

19. The method of 11, further comprising: providing a heat exchanger in the interior space;
providing a lubricant circulation system in fluid communication with the heat exchanger and disposed in a forward portion of the gas turbine engine; and
circulating lubricant through the heat exchanger and the lubricant circulation system.

20. The method of claim 19, further comprising:
providing a lubricant filter in the lubricant circulation system; and circulating lubricant through the lubricant filter.

* * * * *